(12) United States Patent
Yu et al.

(10) Patent No.: US 10,150,492 B2
(45) Date of Patent: Dec. 11, 2018

(54) MULTIFUNCTIONAL FOLDABLE TROLLEY

(71) Applicant: Zhuhai Shichang Metals Ltd., Zhuhai (CN)

(72) Inventors: Hai Yu, Zhuhai (CN); Che-Jen Wang, Zhuhai (CN)

(73) Assignee: Zhuhai Shichang Metals Ltd. (CN)

( * ) Notice: Subject to any disclaimer, the term of this patent is extended or adjusted under 35 U.S.C. 154(b) by 0 days.

(21) Appl. No.: 15/825,328

(22) Filed: Nov. 29, 2017

(65) Prior Publication Data

US 2018/0154916 A1 Jun. 7, 2018

Related U.S. Application Data

(63) Continuation-in-part of application No. 15/370,308, filed on Dec. 6, 2016, now Pat. No. 9,908,548.

(51) Int. Cl.
| | | |
|---|---|---|
| *B62B 1/26* | (2006.01) | |
| *B62B 3/02* | (2006.01) | |
| *B62B 3/00* | (2006.01) | |

(52) U.S. Cl.
CPC .............. *B62B 3/027* (2013.01); *B62B 3/025* (2013.01); *B62B 3/002* (2013.01)

(58) Field of Classification Search
CPC ......... B62B 3/022; B62B 3/108; B62B 3/006; B62B 2202/00; B62B 2202/30; B62B 3/027; B62B 3/025; B62B 3/002

(Continued)

(56) References Cited

U.S. PATENT DOCUMENTS

| | | | |
|---|---|---|---|
| 2,621,815 A * | 12/1952 | Gannon | ................. B62B 3/108 211/20 |
| D189,454 S | 12/1960 | Klein | |
| D200,401 S | 2/1965 | Olson | |
| D223,707 S | 5/1972 | Salisbury | |

(Continued)

FOREIGN PATENT DOCUMENTS

| | | |
|---|---|---|
| EP | 2258599 A2 | 12/2010 |
| EP | 2258599 A3 | 12/2013 |
| WO | 2012064849 A1 | 5/2012 |

OTHER PUBLICATIONS

European Patent Office; European Search Report, Application No. EP 17 21 0966, dated Jul. 5, 2018, Place of Search Munich.

*Primary Examiner* — John D Walters
(74) *Attorney, Agent, or Firm* — Luedeka Neely Group, PC

(57) ABSTRACT

A trolley configured for use to carry both round and rectangular folding tables of a variety of sizes. The trolley includes a frame having a floor located adjacent a loading end of the frame. The floor includes a planar central portion bounded on each side by angled ramp portions which terminate at elevated flat portions, one of the elevated flat portions being located adjacent the loading end of the frame; and a plurality of receivers located on the frame. The trolley also includes a handle rack locatable at an end of the frame opposite the loading end of the frame. The handle rack includes a pair of rack legs, each rack leg having a handle rack mount located at a lower end of the rack leg and configured to be received by one of the receivers of the frame. The handle rack mounts cooperate with corresponding ones of the receivers of the frame to enable the handle rack to be mounted to the frame and selectively positioned in either an upright position relative to the frame or in a folded orientation wherein the handle rack is folded to a lowered position adjacent the frame. The trolley also includes a pair of side rails locatable adjacent sides of the (Continued)

frame, the side rails including a pair of rail legs. Each rail leg has a rail mount located at a lower end of the rail leg and configured to be received by one of the receivers of the frame. The rail mounts cooperate with corresponding ones of the receivers of the frame to enable the side rails to be mounted to the frame and selectively positioned in either an upright position relative to the frame or in a folded orientation wherein the side rails are each folded to a lowered position adjacent the frame.

7 Claims, 29 Drawing Sheets

(58) Field of Classification Search
USPC ...... 280/651, 43.11, 46.12, 79.11, 79.6, 79.7
See application file for complete search history.

(56) References Cited

U.S. PATENT DOCUMENTS

| | | | |
|---|---|---|---|
| 4,856,810 A | 8/1989 | Smith | |
| D333,370 S | 2/1993 | Monk | |
| D398,431 S | 9/1998 | McDonald | |
| 6,296,262 B1 * | 10/2001 | Skinner | B62B 3/108 280/35 |
| D565,824 S | 4/2008 | Mueller | |
| 7,992,883 B2 * | 8/2011 | Brandon | B62B 3/108 280/47.34 |
| D649,320 S | 11/2011 | Renfrew et al. | |
| D664,737 S | 8/2012 | Slank | |
| 8,342,544 B1 | 1/2013 | Blewett et al. | |
| 8,641,061 B1 * | 2/2014 | Sims | B62B 3/022 280/651 |
| D723,762 S | 3/2015 | Treadwell | |

* cited by examiner

MULTIFUNCTIONAL FOLDABLE TROLLEY

CROSS-REFERENCE TO RELATED APPLICATION

This is a continuation-in-part of co-pending (Allowed) U.S. patent application Ser. No. 15/370,308 filed Dec. 6, 2016, entitled MULTIFUNCTIONAL FOLDABLE TROLLEY, incorporated herein by reference in its entirety.

FIELD

This present disclosure relates to trolleys and carts. More particularly, the disclosure relates to a trolley that is multifunctional, easy to assemble, lightweight, and foldable so as to be easily storable without disassembly.

BACKGROUND

Trolleys or carts of the type used to store and transport folding tables desire improvement.

The present disclosure relates to an improved multifunctional folding trolley.

Conventional trolleys are of fixed size, heavy, and are complicated to assemble and disassemble. Conventional trolleys are not foldable and require substantial space for storage, unless disassembled for storage. The complication of assembly and disassembly renders this option undesirable.

In addition, conventional trolleys for use with folding tables are typically made to fit a certain size and shape table. Thus, if one has a variety of table sizes and configurations to transport, one typically must have several different trolleys.

With the development of market demand, a new type of trolley is desired, the features of which are multifunctional, easy to assemble, lightweight, and foldable so as to be easily storable without disassembly.

SUMMARY

The disclosure advantageously provides improved trolley structures configured for use to carry both round and rectangular folding tables of a variety of sizes.

In one aspect, a trolley according to the disclosure includes a frame having a floor located adjacent a loading end of the frame. The floor includes a planar central portion bounded on each side by angled ramp portions which terminate at elevated flat portions, one of the elevated flat portions being located adjacent the loading end of the frame; and a plurality of receivers located on the frame.

The trolley also includes a handle rack locatable at an end of the frame opposite the loading end of the frame. The handle rack includes a pair of rack legs, each rack leg having a handle rack mount located at a lower end of the rack leg and configured to be received by one of the receivers of the frame. The handle rack mounts cooperate with corresponding ones of the receivers of the frame to enable the handle rack to be mounted to the frame and selectively positioned in either an upright position relative to the frame or in a folded orientation wherein the handle rack is folded to a lowered position adjacent the frame.

The trolley also includes a pair of side rails locatable adjacent sides of the frame, the side rails including a pair of rail legs. Each rail leg has a rail mount located at a lower end of the rail leg and configured to be received by one of the receivers of the frame. The rail mounts cooperate with corresponding ones of the receivers of the frame to enable the side rails to be mounted to the frame and selectively positioned in either an upright position relative to the frame or in a folded orientation wherein the side rails are each folded to a lowered position adjacent the frame.

Trolleys according to the disclosure are multifunctional, foldable, and easily assembled and disassembled. The trolleys may also be easily adjusted to carry a variety of load sizes. In particular, the trolleys are configured for use to carry both round and rectangular folding tables of a variety of sizes.

BRIEF DESCRIPTION OF THE DRAWINGS

Further advantages of the disclosure are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
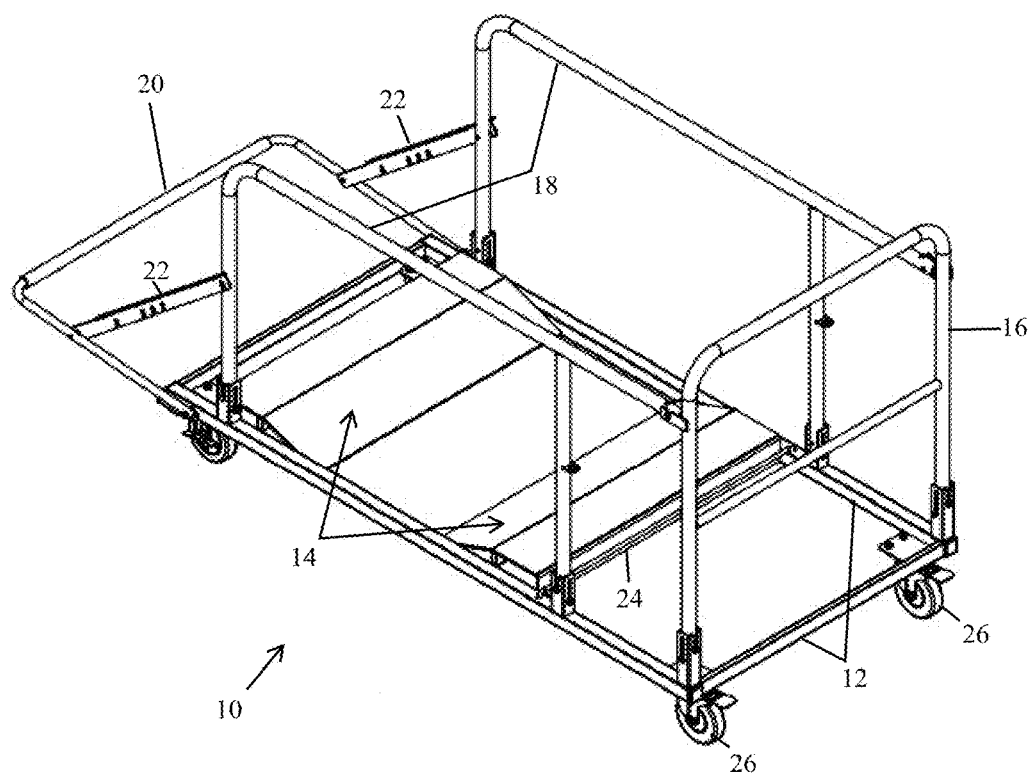
FIGS. 1 and 2 are perspective views of a foldable multifunctional trolley according to the disclosure.
Figure 2:
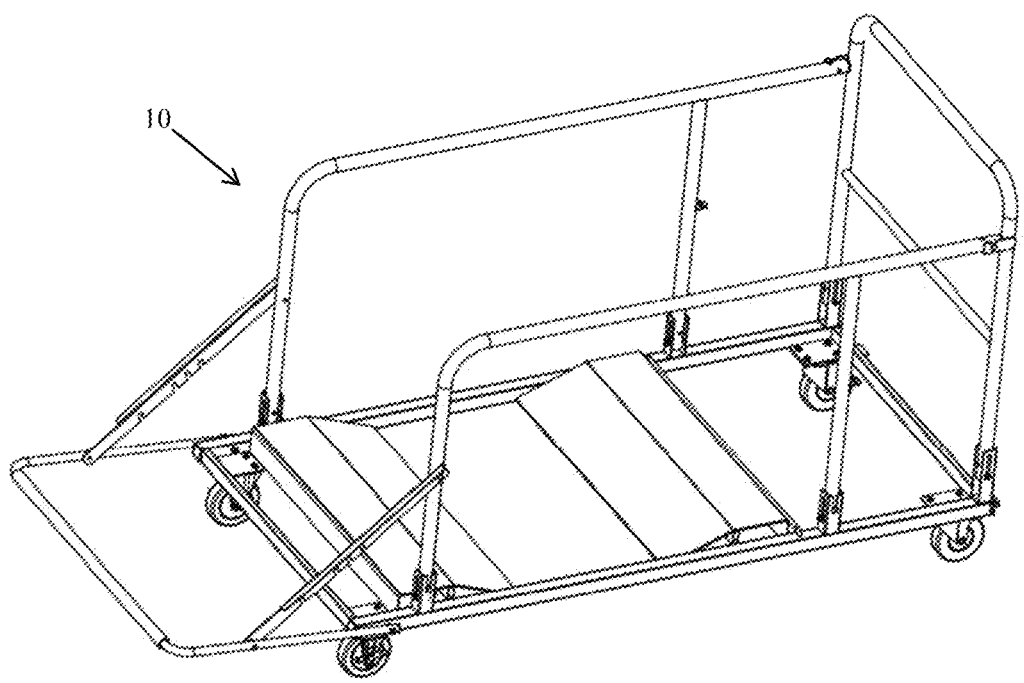
Figure 3:
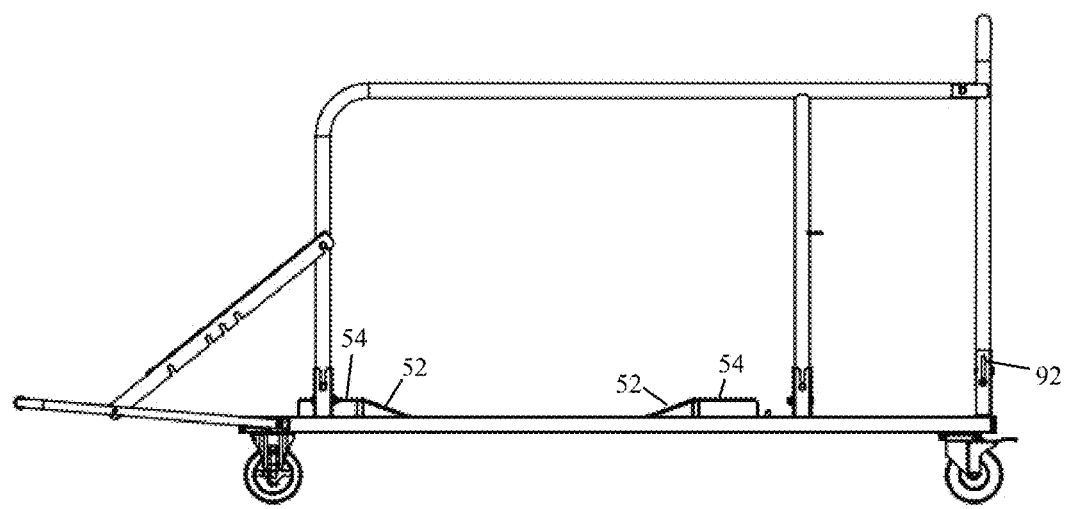
FIG. 3 is a side view of the trolley of FIGS. 1 and 2.
Figure 4:
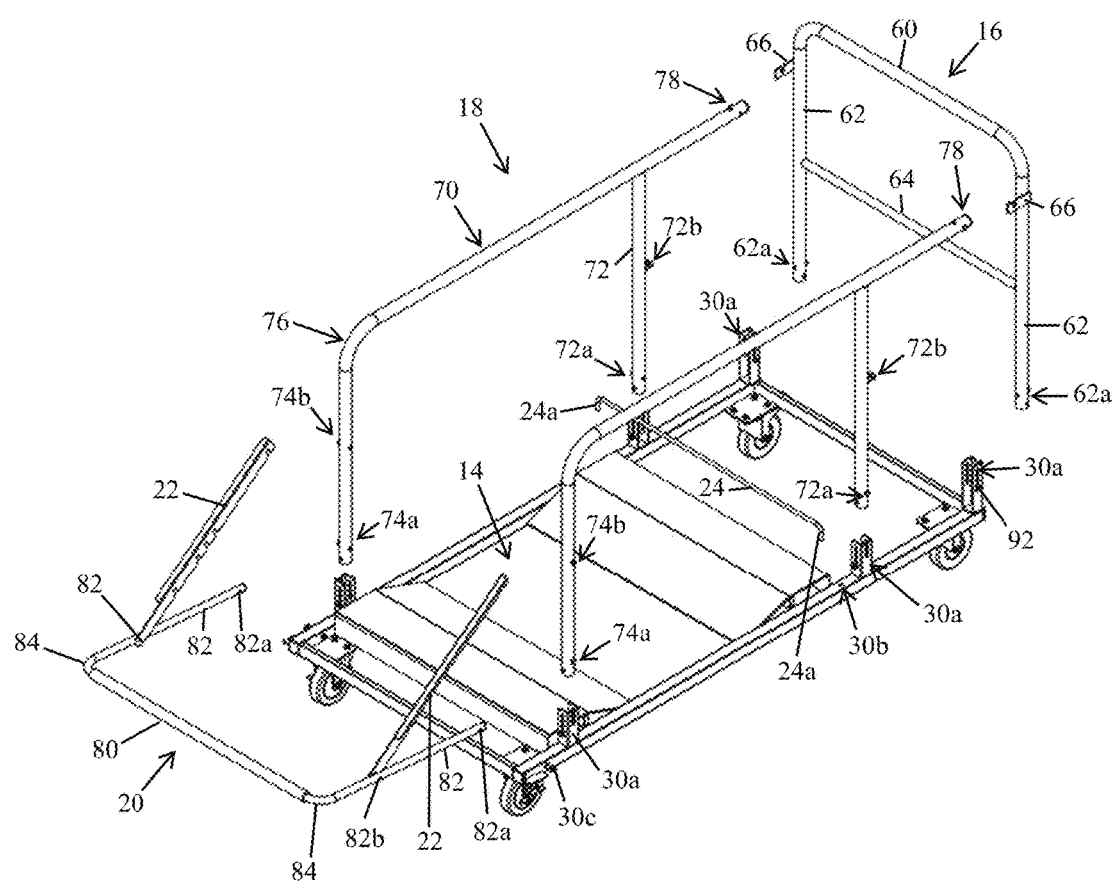
FIGS. 4 and 5 are exploded views of the trolley of FIGS. 1 and 2.
Figure 5:
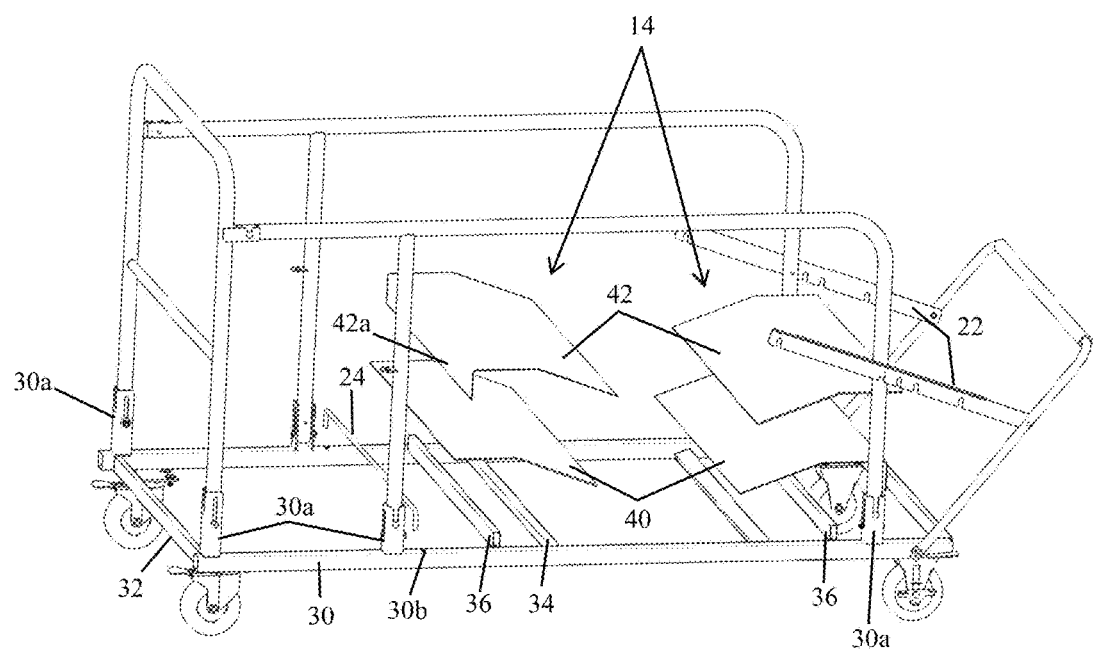
Figure 6:
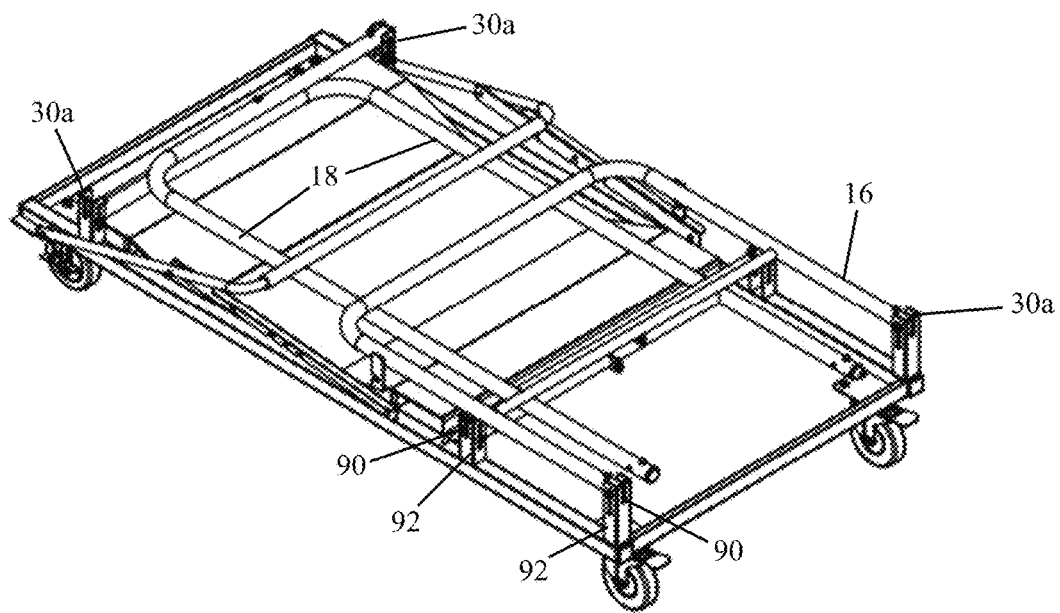
FIGS. 6 and 7 show the trolley of FIGS. 1 and 2 in a folded configuration.
Figure 7:
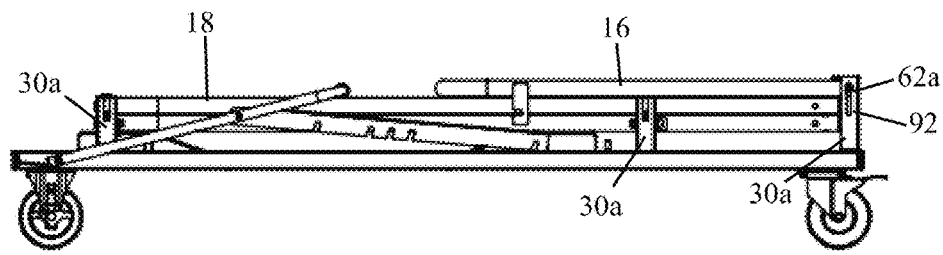
Figure 8:
FIGS. 8-11 show positioning structures for folding components of the trolley of FIGS. 1 and 2.
Figure 9:
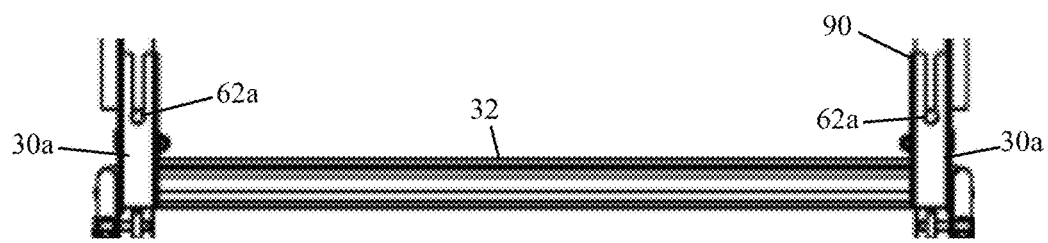

With initial reference to the drawings, the disclosure relates to a foldable multifunctional trolley 10 having a frame 12 supporting a floor 14, a handle rack 16, side rails 18, an adjustably positionable u-shaped gate 20, gate adjusters 22, and a load support 24. A plurality of wheels 26 are located on a bottom portion of the frame 12 to permit mobility of the trolley 10. The trolley 10 is advantageously configured to have improved structure, function and aesthetics. The components of the trolley 10 are desirably made of steel, with a powder coat finish for rust resistance.

The frame 12 may be provided as by a pair of side frame members 30 and a pair of end frame members 32, each preferably made of steel. The frame members 30 and 32 may be welded or otherwise fixed together to provide the frame 12 in a rectangular configuration. The frame 12 includes floor supports 34 and 36 extend between the side frame members 30 for supporting the floor 14. The floor supports 34 and 36 are preferably made of steel and may be welded or otherwise fixed to the side frame members 30. The side rails 30 include mounts, such as receivers 30a for cooperating with the handle rack 16 and the side rails 18 for ease of assembly and disassembly. The side rails 12 include mounts, such as receivers 30b, for cooperating with the support 24. The side rails include mounts, such as apertures into which pins 30c are received, for pivotally mounting the u-shaped gate 20 to the frame 12.

The floor 14 may be provided as by two pairs of angled steel plates 40 and 42 oriented with the plate 42 overlying the plate 40 to provide a reinforced floor construction. The plate 40 may be welded or otherwise affixed to the floor supports 34 and 36, with the plate 42 welded or affixed to the plate 40 and the floor support 36. In this regard, the plate 42 includes a lip 42a that overlies the floor support 36. The floor 14 is located adjacent a loading end of the frame 12 and is configured to have a planar or flat central portion 50 bounded on each side by angled ramp portions 52, which terminate at elevated flat portions 54.

The handle rack 16 is used by a user to push the trolley 10 and is preferably of welded steel construction and is u-shaped with a lateral member 60 and two legs 62 depending from the ends of the lateral member 60. A cross member 64 extends between the legs 62. To facilitate ease of assembly and disassembly, the handle rack 16 includes mounts, such as hooks 66 welded thereto for releasably engaging and cooperating with the side rails 18 for quick connect and disconnect. Elbows 68 may be provided between the legs 62 and the lateral member 60 to provide a rounded appearance. Lower ends of the legs 62 includes mounts, such as pegs 62a for cooperating with the receivers 30a of the side rails 30 of the frame 12.

The side rails 18 are preferably of welded steel construction and include a lateral member 70 and legs 72 and 74. The leg 74 is located adjacent an end of the lateral member 70 and preferably connects thereto as by an elbow 76 to provide a rounded appearance. Mounts, such as pegs 78 are located adjacent the free end of the lateral member 70 for cooperating with the hooks 66 of the handle rack 16. Lower ends of the legs 72 include mounts, such as pegs 72a, and lower ends of the legs 74 include mounts, such as pegs 74a, for cooperating with the receivers 30a of the side rails 30 of the frame 12. Mid portions of the legs 72 include mounts, such as receivers 72b, for cooperating with the support 24. Mid portions of the legs 74 include mounts, such as pegs 74b, for cooperating with the leg adjusters 22.

The u-shaped gate 20 is preferably of welded steel construction and is u-shaped with a lateral member 80 and two legs 82 depending from the ends of the lateral member 80. Elbows 84 may be used to connect the legs 82 to the lateral member 80 to provide a rounded configuration. Lower ends of the legs 82 include receivers, such as apertures 82a, for receiving the pins 30c of the frame 12 for pivotally mounting the u-shaped gate 20 to the frame 12. Mounts, such as apertures having pins 82b, are located on upper portions of the legs 82 for pivotally mounting the gate adjusters 22 to the u-shaped gate 20.

Figure 10:
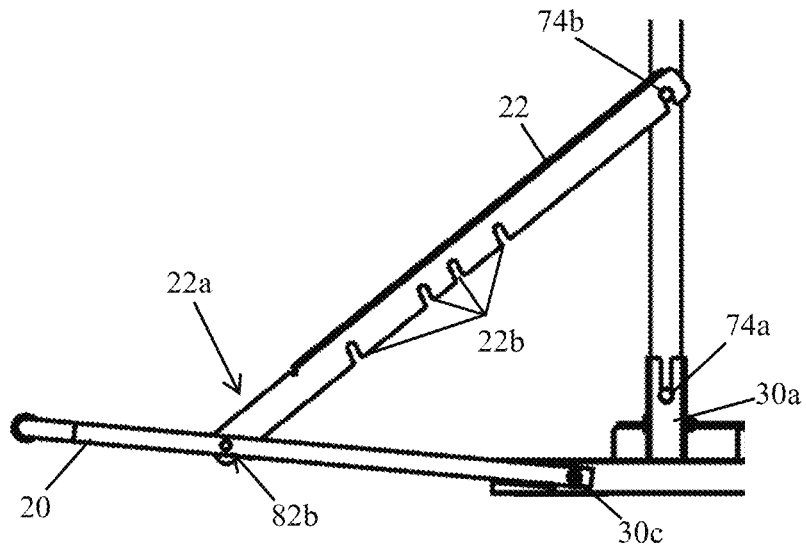
Figure 11:
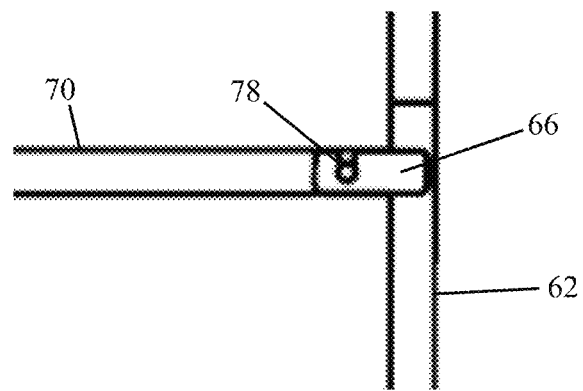

The gate adjusters 22 are preferably provided by flat steel bars. The gate adjusters 22 include a receiver, such as an aperture 22a, adjacent one end, for cooperating with the pins 82b of the u-shaped gate 20 for pivotally mounting of the gate adjusters 22 to the u-shaped gate 20. Receivers, such as slots 22b, are defined and spaced along an edge and the opposite end of the gate adjusters 22 for cooperating with the pegs 74b of the legs 74 for releasably affixing the gate adjusters 22 to the legs 74 of the trolley 10 (FIG. 10). Thus, the angle of the gate 20 relative to the frame 12 may be adjusted to a variety of angular orientations as may be desired for situating the gate 20 for a given load.

Figure 12:
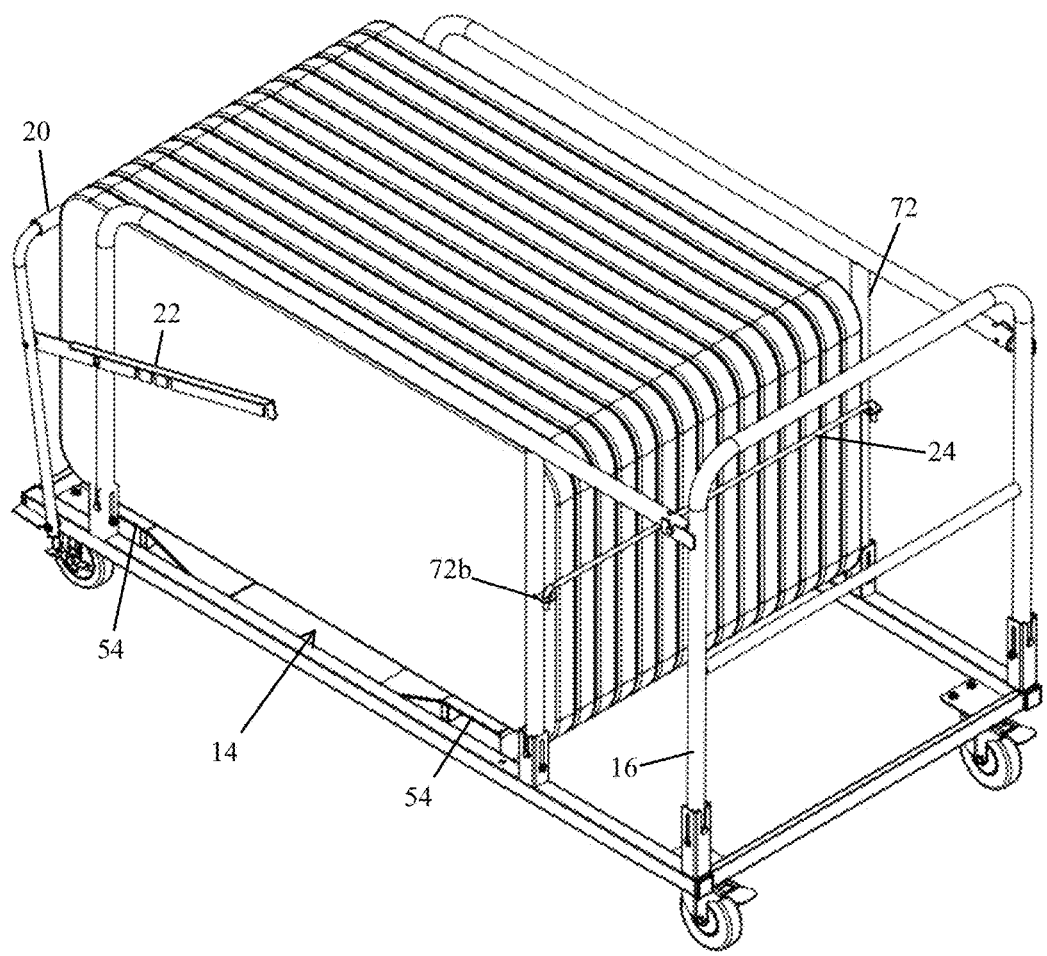
FIG. 12 shows the trolley of FIG. 1 loaded to carry four-foot rectangular folding tables.
Figure 13:
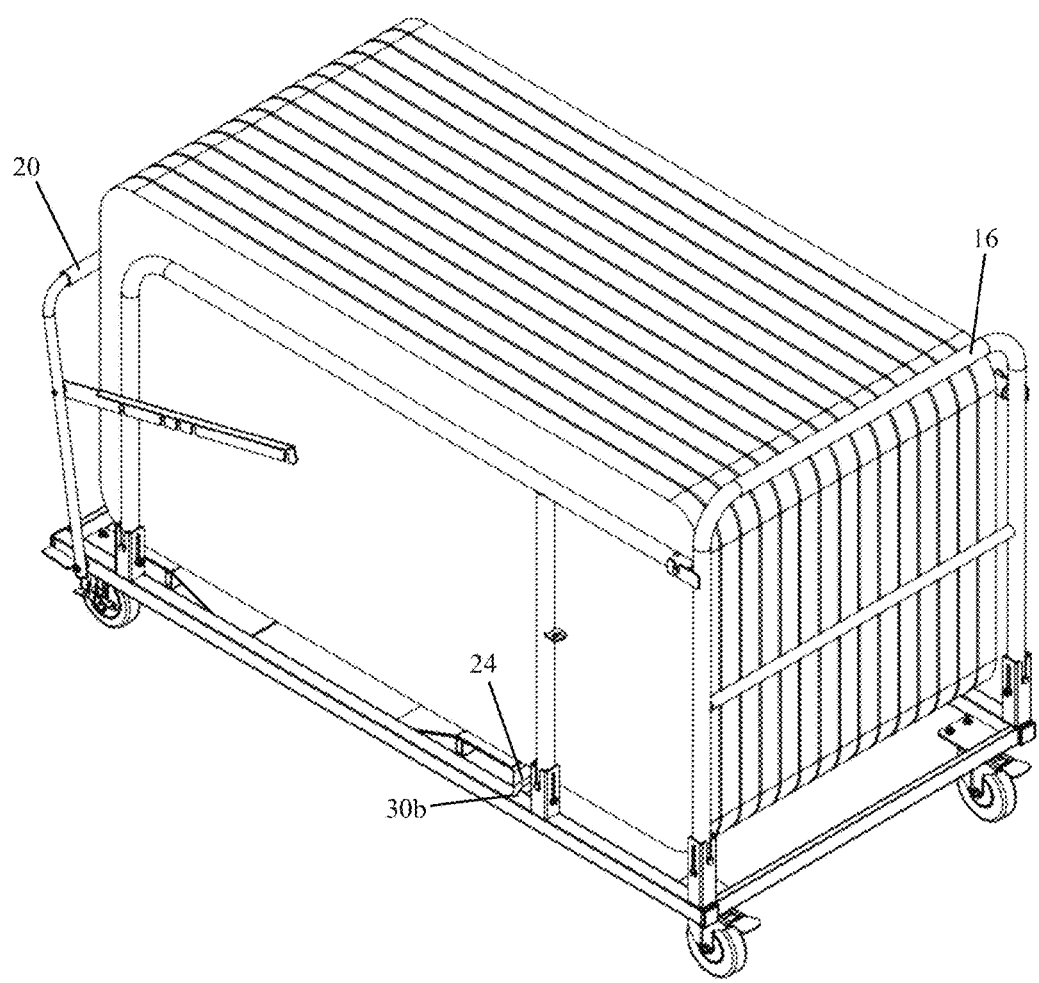
FIG. 13 shows the trolley of FIG. 1 loaded to carry five-foot rectangular folding tables.

The load support 24 is preferably an elongate, stiff wire. The load support 24 can be positioned based on the load to be carried by the trolley 10. For example, as seen in FIG. 12, for a load such as shown of shorter tables, the load support 24 is desirably located in the receivers 72b of the legs 72 so as to provide a support to keep the tables from sliding toward the handle rack 16. Alternatively, if the load is longer tables, such as seen in FIG. 13, the load support 24 is located to be received by the receivers 30b of the frame 12 in an out of the way storage position.

The trolley 10 is easily assembled by installing the handle rack 16, the handle rack 16, the side rails 18, and the gate 20 onto the frame 12 by use of the cooperating mounts, which are configured for quick cooperation, and requiring no tools. Likewise, the trolley 10 may easily be disassembled by reversing the assembly.

The receivers 30a of the side rails 12 are configured to cooperate with the mounts, such as the pegs 62a of the legs 62 of the handle rack 16, to enable quick assembly and disassembly of the handle rack 16 from the frame 12. The receivers 30a cooperate with the pegs 62a to permit the handle rack to have a stable upright installation. For example, the receivers 30 may be provided as by upright cylinders having a plurality of longitudinal open slots 90 and closed slots 92 formed in their sidewall. The slots 90 and 92 are arranged to correspond to the locations of the pegs 62a to receive the pegs 62a to maintain the legs 62 in a stable and upright position. The receivers 30a and the pegs 62a also cooperate to permit the legs 62, and hence the handle rack 16, be foldable relative to the frame 12. The receivers 30 are shown as square cylinders, but may be round or other configuration to cooperate with the legs.

The receivers 30a of the side rails 18 are also configured to cooperate with the mounts of the side rails 18, such as the pegs 72a of the legs 72 and the pegs 74a of the legs 74 to provide a stable, upright position of the side rails 18, and to permit folding of the rails 18 if desired. As will be noted, the receivers 30 are of uniform structure which facilitates construction. However, the receivers 30a associated with the side rails 18 are oriented 90 degrees as compared to the receivers 30a associated with the handle rack 16. This desirably positions the open slots 92 to permit the respective directions of folding of the side rails 18 and the handle rack 16, as best seen in FIGS. 6-9. Thus, as shown, the trolley 10 may be easily folded for storage, and then unfolded for use.

The trolley 10 is also advantageously configured to be multifunctional and adaptable to carry a variety of loads. In particular, the trolley 10 is configured for use with folding tables. Conventional trolleys for use with folding tables are typically made to fit a certain size and shape table. The trolley 10 is advantageously configured to be adaptable to carry both round and rectangular tables of a variety of sizes. For example, FIGS. 12-20 show the trolley 10 adjustably configured to carry round and rectangular tables of a variety of sizes.

FIG. 12 shows the trolley 10 carrying four-foot rectangular folding tables. For this, the gate 20 is positioned to be substantially vertical, and the load support 24 is positioned in the receivers 72*b* of the legs 72 so as to provide a support to keep the tables from sliding toward the handle rack 16. The rectangular tables extend across the floor 14 and rest on the elevated flat portions 54 of the floor 14.

FIG. 13 shows the trolley 10 carrying five-foot rectangular folding tables. For this, the gate 20 is positioned to be substantially vertical, and the load support 24 is received by the receivers 30*b* of the frame 12 in an out of the way storage position.

Figure 14:
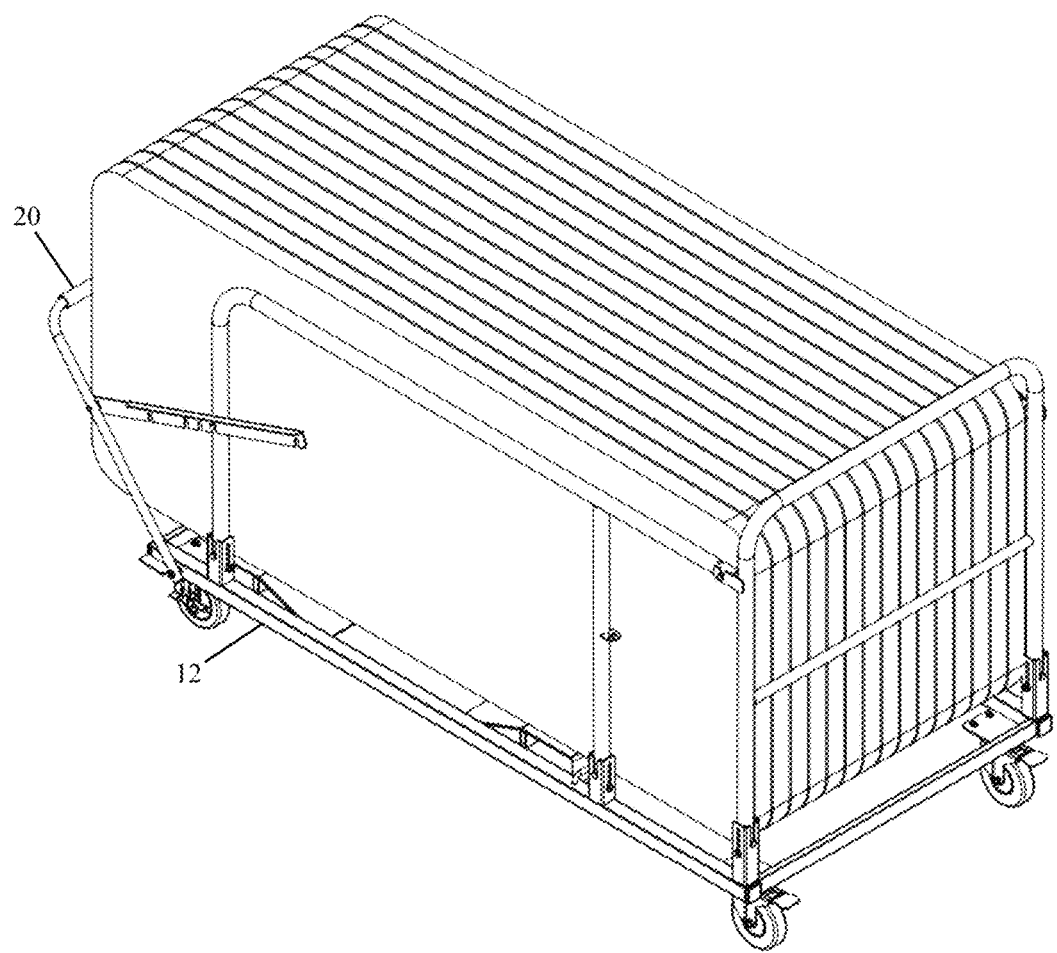
FIG. 14 shows the trolley of FIG. 1 loaded to carry six-foot rectangular folding tables.

FIG. 14 shows the trolley 10 carrying six-foot rectangular folding tables. For this, the configuration is the same as shown in FIG. 13, except the gate 20 is angled slightly more away from the frame 12.

Figure 15:
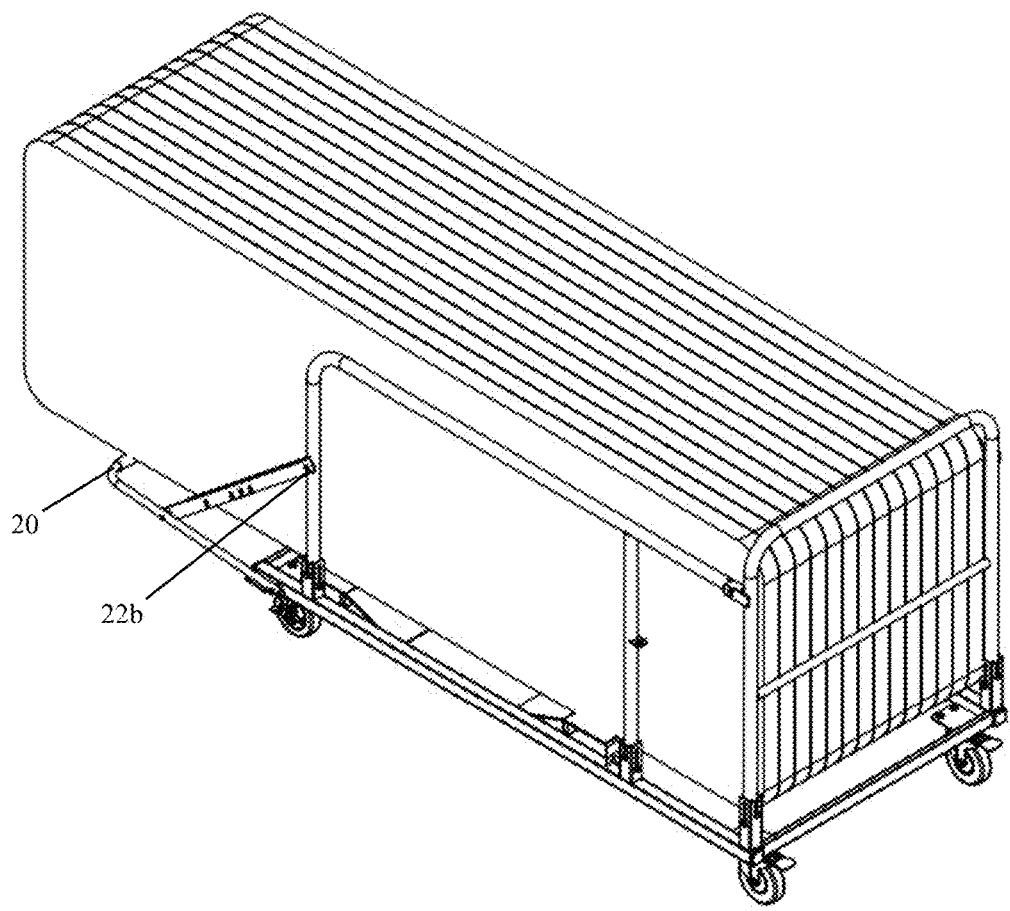
FIG. 15 shows the trolley of FIG. 1 loaded to carry eight-foot rectangular folding tables.

FIG. 15 shows the trolley 10 carrying eight-foot rectangular folding tables. For this, the configuration is the same as shown in FIG. 13, except the gate 20 is fully lowered.

Figure 16:
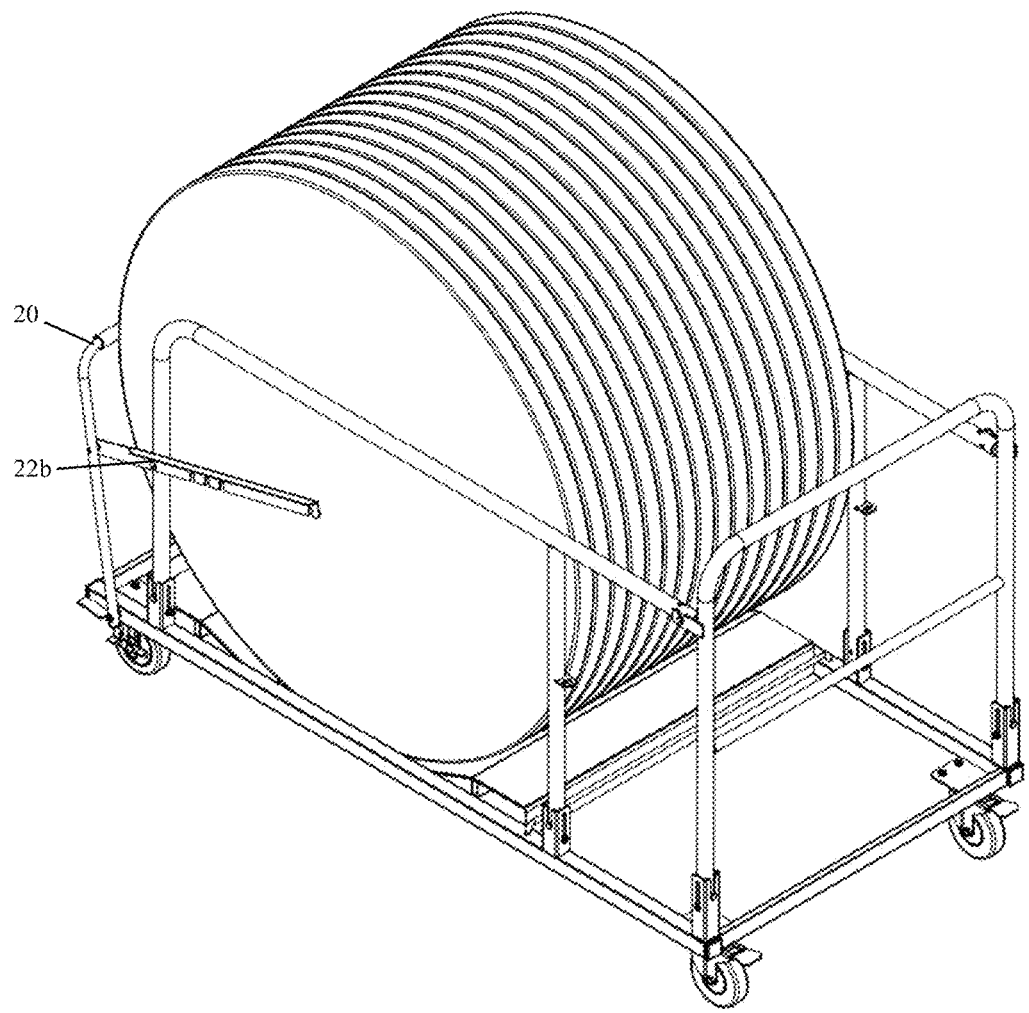
FIG. 16 shows the trolley of FIG. 1 loaded to carry forty-eight inch round folding tables.

FIG. 16 shows the trolley 10 carrying forty-eight inch round folding tables. The load support 24 is not needed for round tables, and is hence located out of the way. The floor 14 is advantageously configured to receive and stabilize round tables of a variety of sizes. For carrying forty-eight inch round folding tables, the gate 20 is positioned to be substantially vertical.

Figure 17:
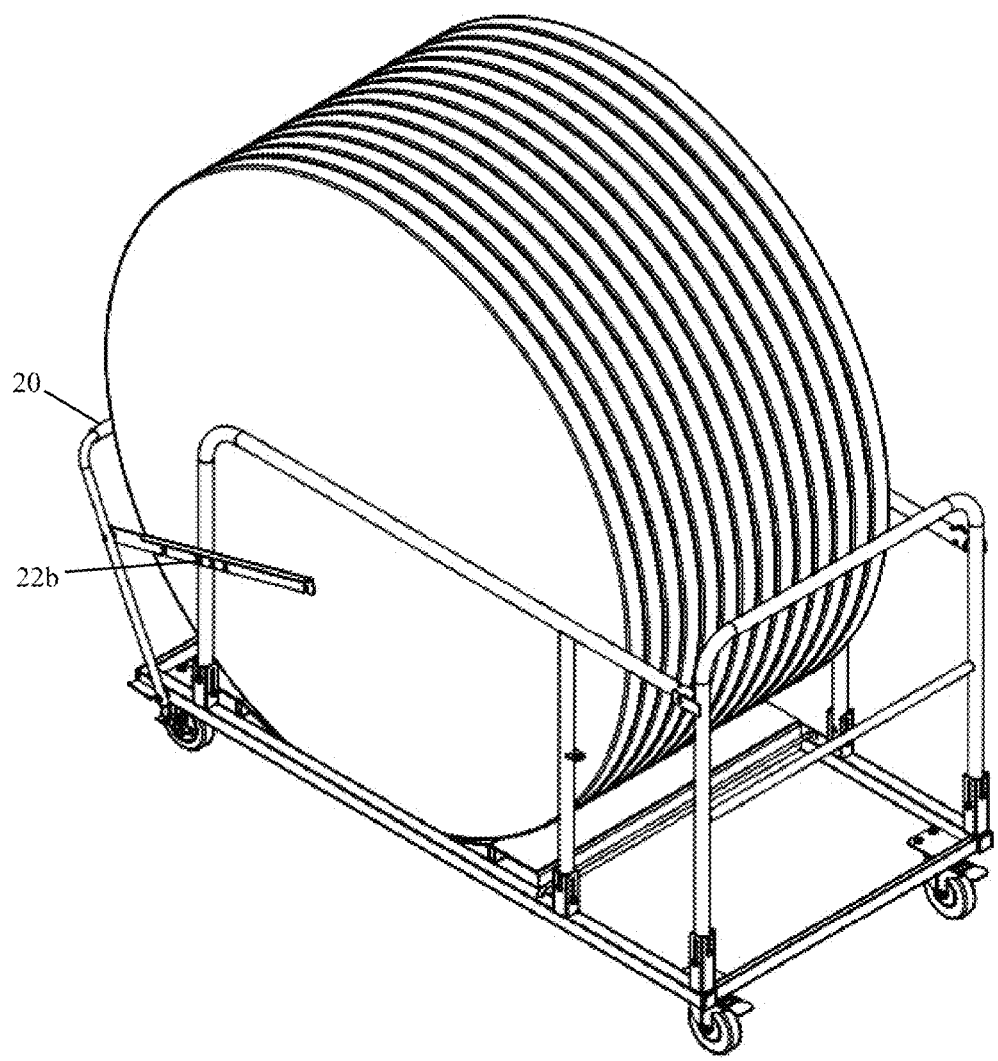
FIG. 17 shows the trolley of FIG. 1 loaded to carry sixty-inch round folding tables.
Figure 18:
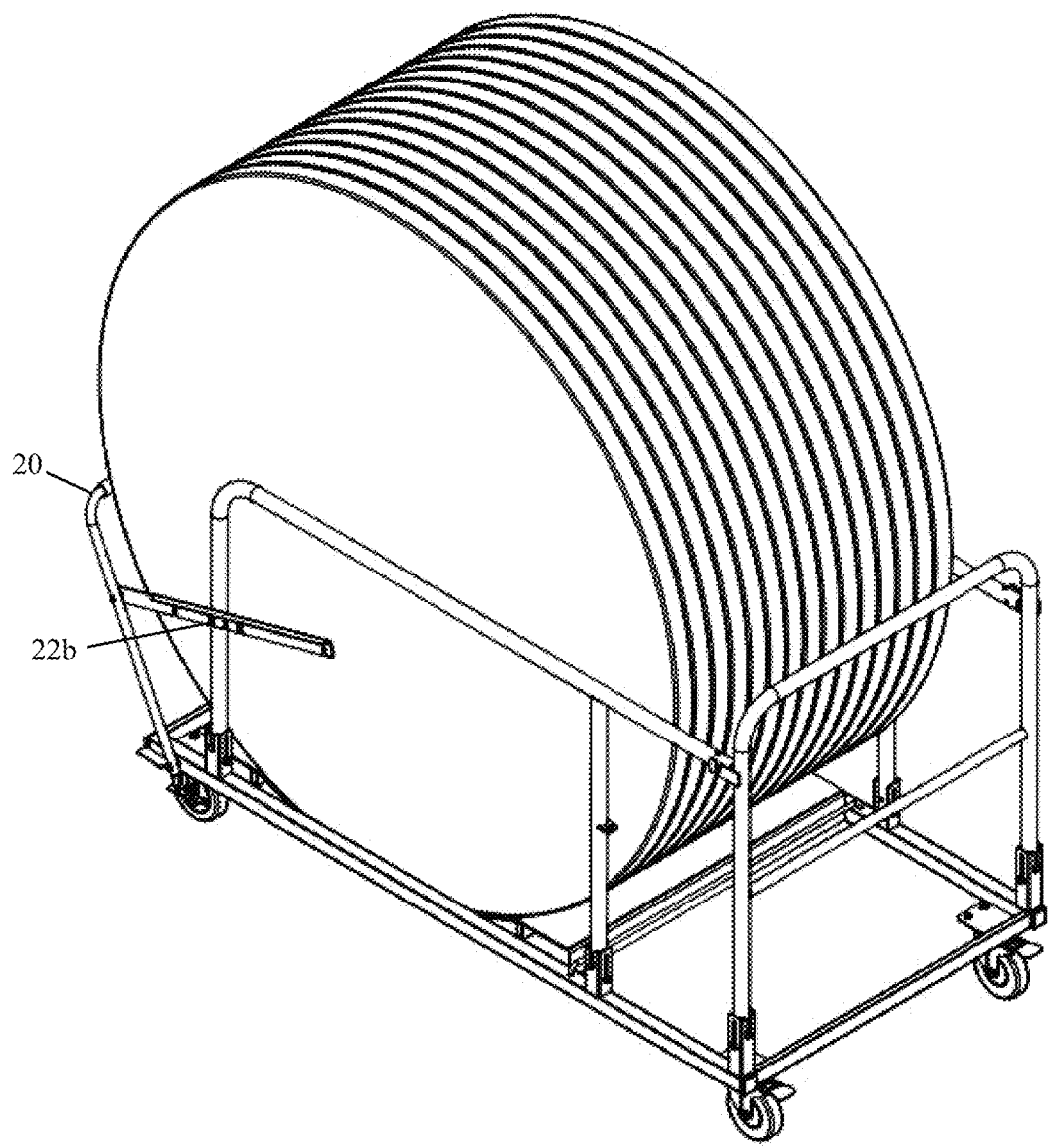
FIG. 18 shows the trolley of FIG. 1 loaded to carry sixty-three inch round folding tables.
Figure 19:
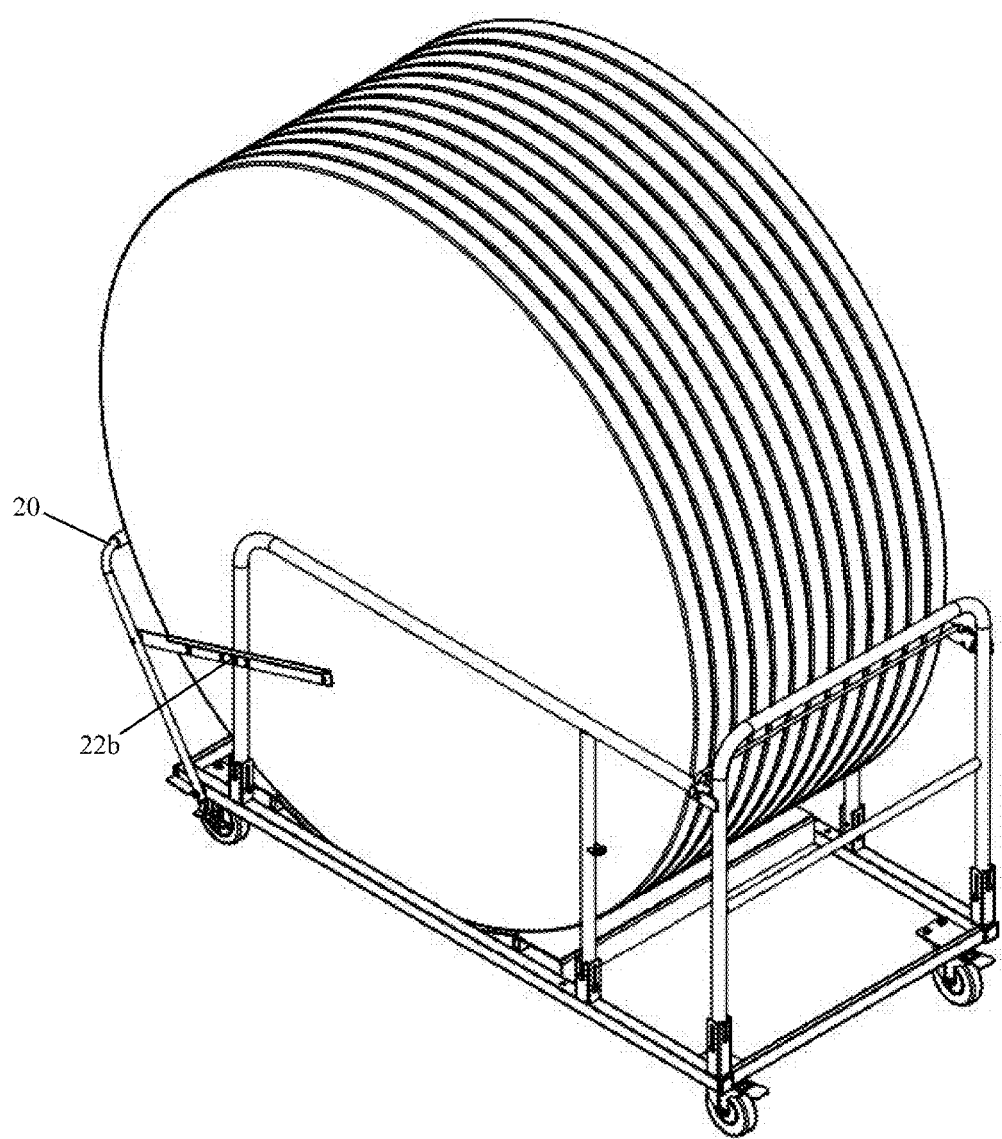
FIG. 19 shows the trolley of FIG. 1 loaded to carry seventy-one inch round folding tables.
Figure 20:
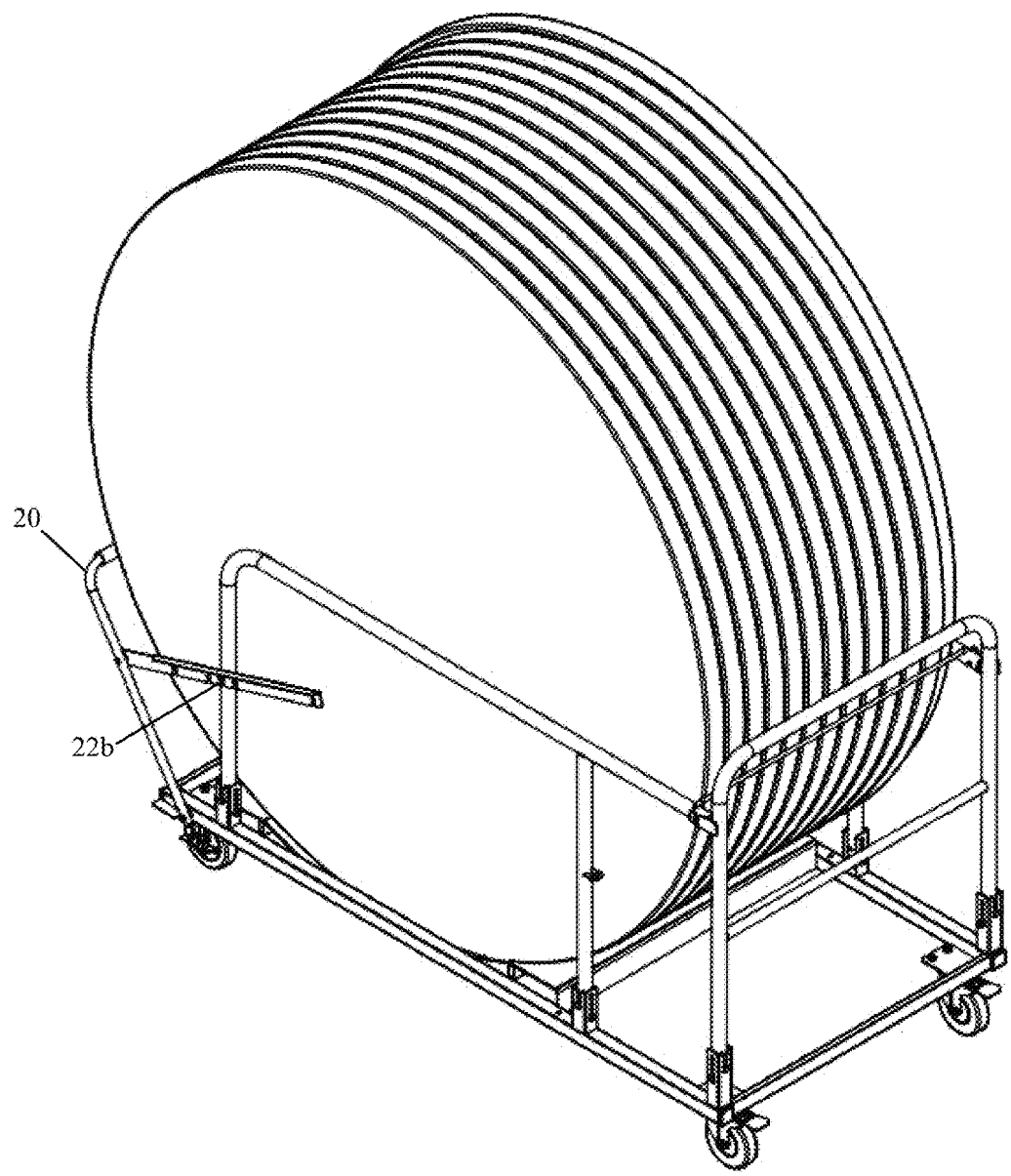
FIG. 20 shows the trolley of FIG. 1 loaded to carry seventy-two inch round folding tables.

FIG. 17 shows the trolley 10 carrying sixty inch round folding tables; FIG. 18 shows the trolley 10 carrying sixty-three inch round folding tables; FIG. 19 shows the trolley 10 carrying seventy-one inch round folding tables; and FIG. 20 shows the trolley 10 carrying seventy-two inch round folding tables. As will be observed, the trolley 10 is configured as in the manner described in connection with FIG. 14, except as the size of the table increases, the angle of the gate 20 is adjusted more towards the horizontal by selecting the appropriate slot 22*b* for each of the adjusters 22 to cooperate with the pegs 74*b* of the legs 74 to provide the desired angle of the gate 20.

Figure 21:
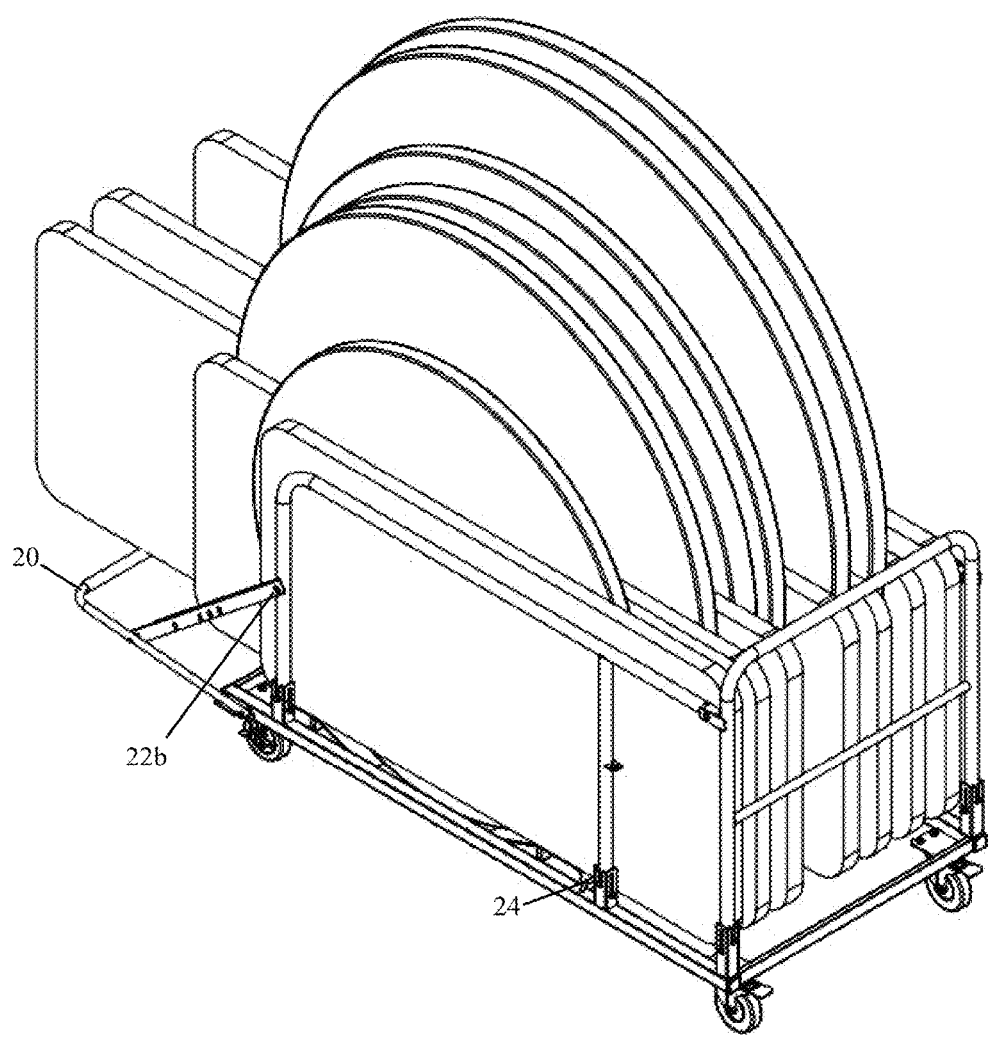
FIG. 21 shows the trolley of FIG. 1 loaded to carry a mixture of round and rectangular tables of the various sizes shown in FIGS. 8-16.
Figure 22:
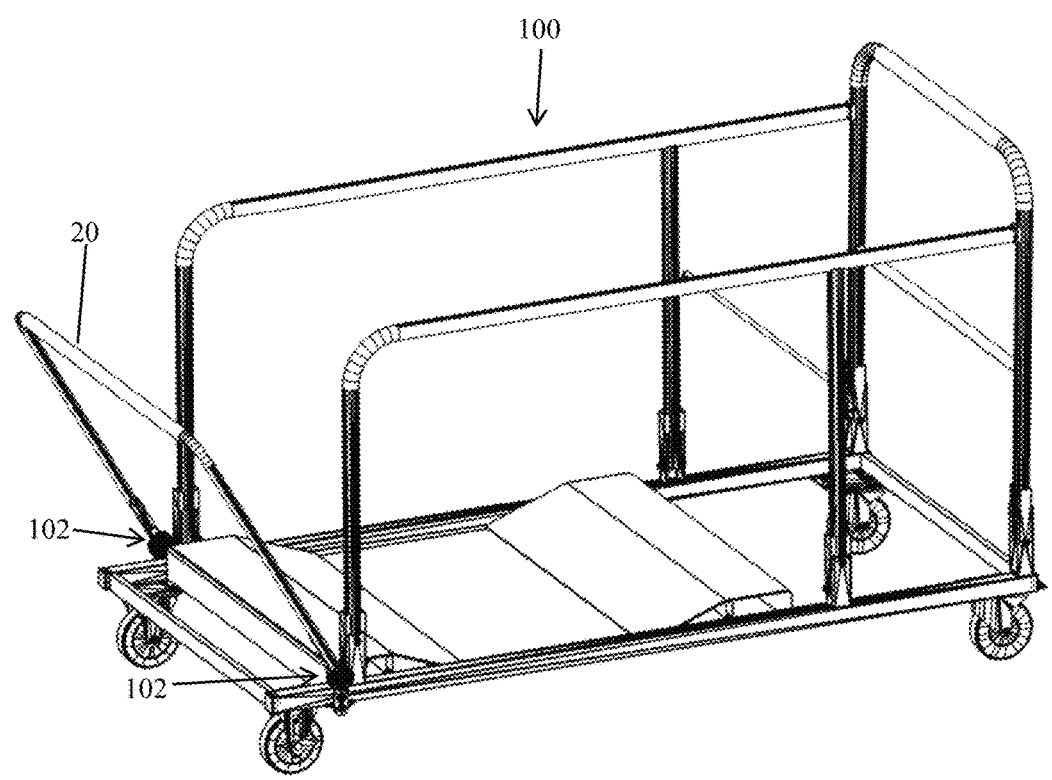
FIG. 22 is a perspective view of a foldable multifunctional trolley according to an alternate embodiment of the disclosure.
Figure 23:
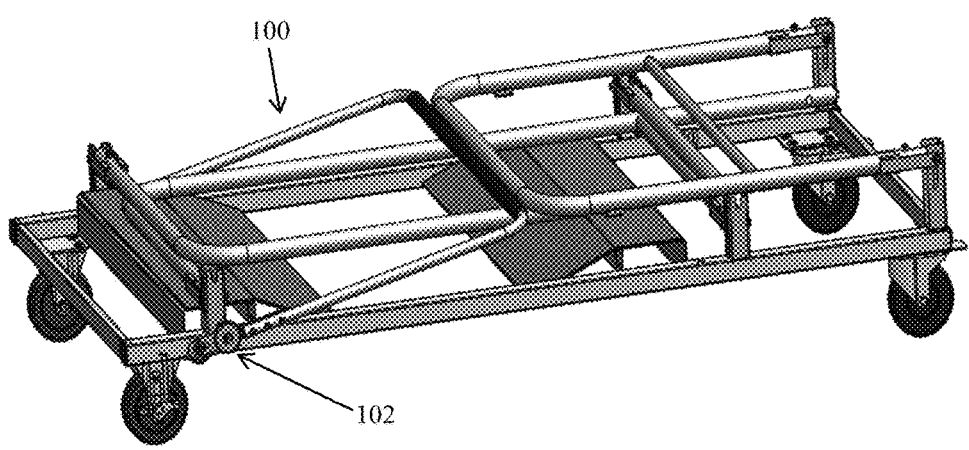
FIG. 23 shows the trolley of FIG. 22 in a folded configuration.
Figure 24:
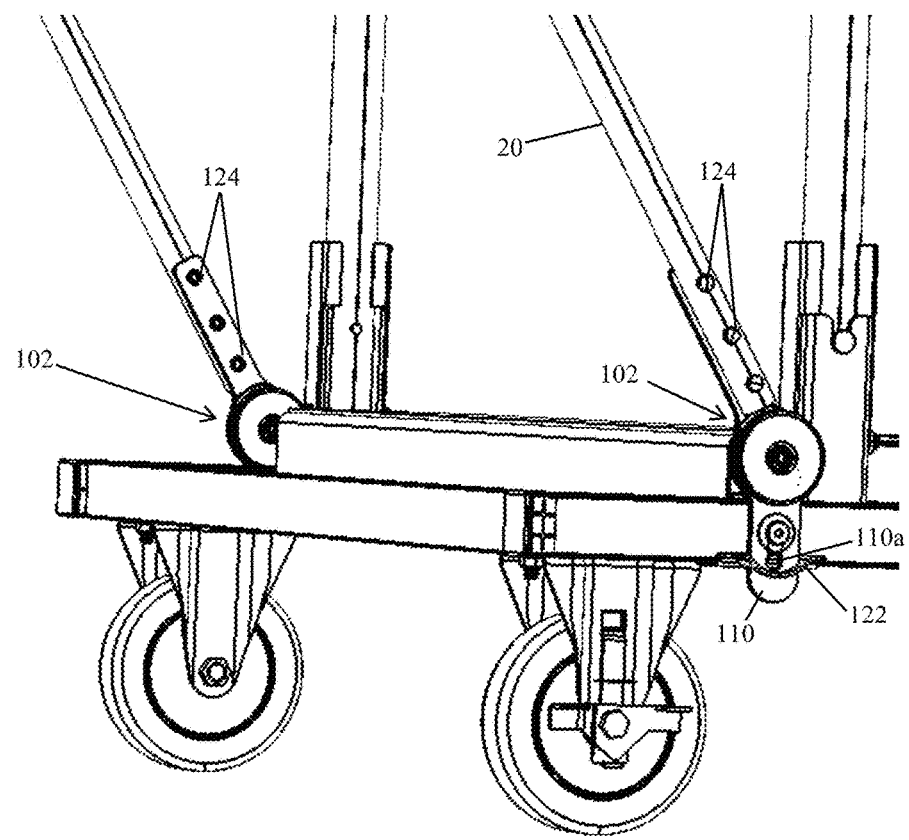
FIG. 24 is a closeup view showing a hinge structure of the trolley of FIG. 22.

Turning now to FIG. 21, the trolley 10 is shown carrying a mixture of round and rectangular tables of the various sizes described above. For this, the load support 24 is located out of the way, and the gate 20 is adjusted to be substantially horizontal.

As will be appreciated, the trolley 10 is advantageously configured to be easily assembled and disassembled, and also easily folded for storage. In addition, the trolley 10 is multifunctional and may be easily adjusted to carry a variety of load sizes. In particular, the trolley 10 is configured for use to carry both round and rectangular folding tables of a variety of sizes.

With reference now to FIGS. 22-32, there is shown another embodiment of a trolley 100. The trolley 100 is substantially similar to the trolley 10, except u-shaped gate 20 is pivotally mounted to the side rails by adjustable angle hinges 102. The hinges 102 eliminate the need for the gate adjusters 22 of the trolley 10, and function to enable adjustable positioning of the gate 20.

Figure 25:
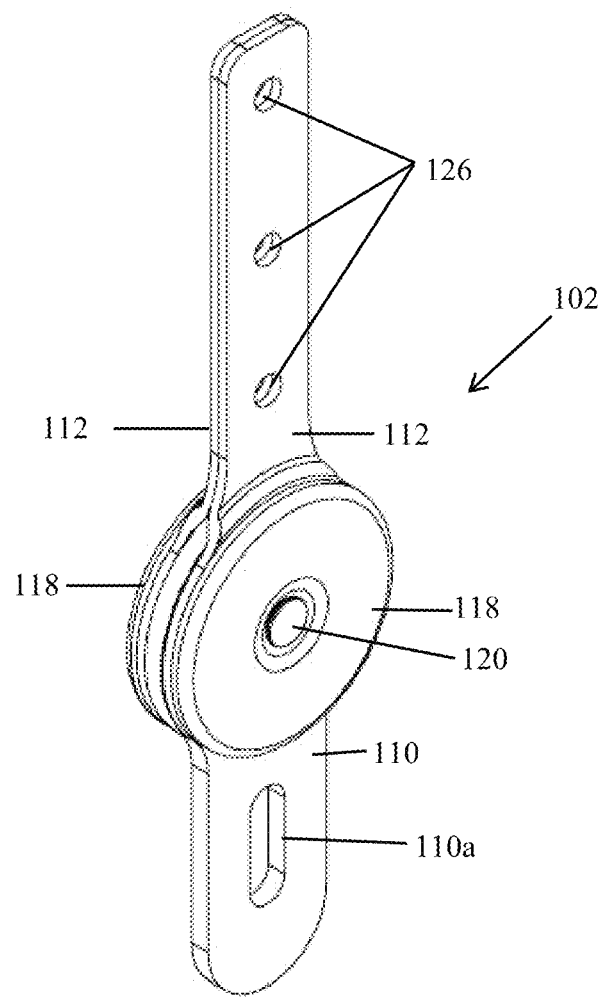
FIG. 25 shows the hinge of FIG. 24.
Figure 26:
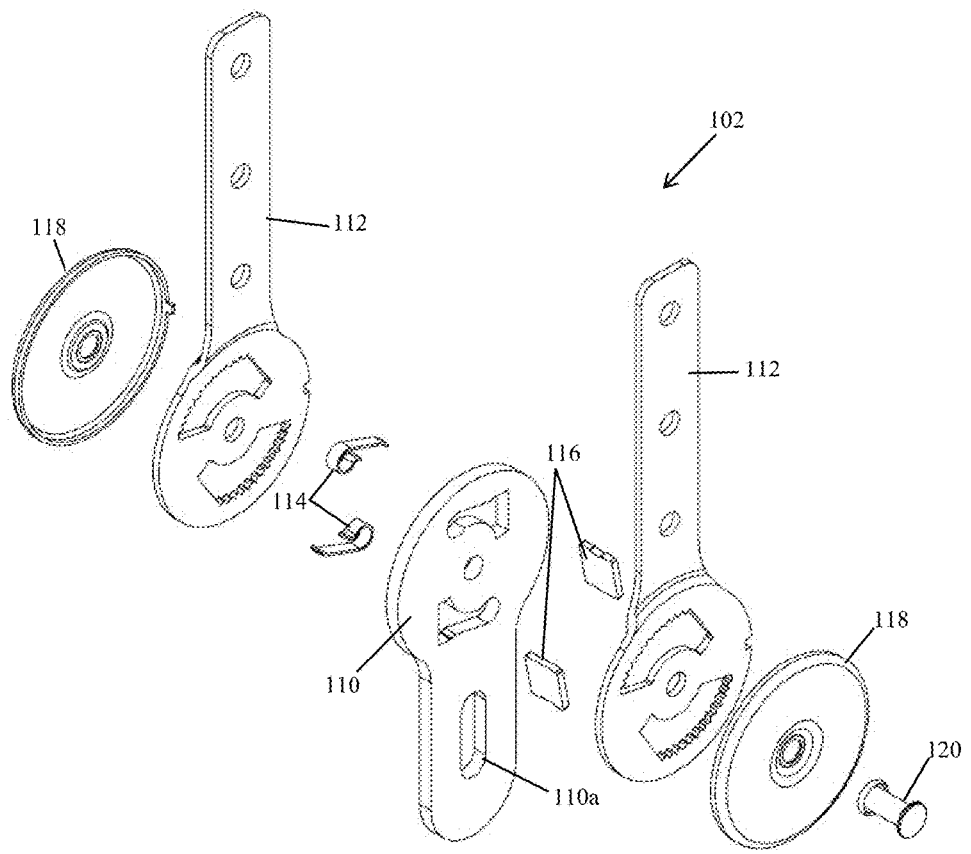
FIG. 26 is an exploded view of the hinge of FIG. 25.

As best seen in FIGS. 25 and 26, the hinges 102 each include a fixed bracket 110, rotatable brackets 112 located on opposite sides of the fixed bracket 110, springs 114, stop plates 116, cover plates 118 and rivet or hub 120.

The hinges 102 mount to the side rails of the trolley 100 as by a fastener passed through a mounting slot 110*a* of the fixed bracket 110 and into the side rail. A lower end of the fixed bracket 110 passes through and seats in a receiver 122 provided on the side rail 12. The hinges 102 are connected to the gate 20 as by fasteners 124 that may be passed through apertures in the lower ends of the gate 20 and corresponding apertures 126 in the rotatable brackets 112.

Figure 27:
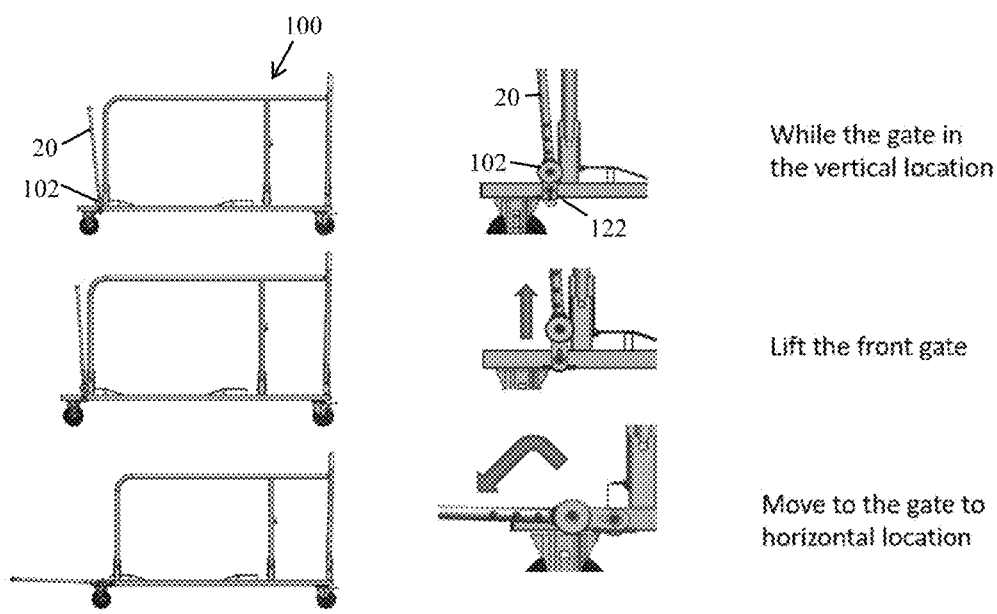
FIG. 27 depicts operation of the hinge.

The springs 114 serve to bear the stop plates 116 in position to lock hinge 102 in an angular position. By lifting on the gate 20, the stop plates 116 are disengaged from engagement with the fixed bracket 110 and the hinge 102 is free to pivot. Once the gate 20 is in a desired orientation, the springs 114 return the stop plates 116 to engagement with the fixed bracket 110 and the hinge 102 is locked in place. Positioning of the gate 20 in this manner is shown in FIG. 27.

Figure 28:
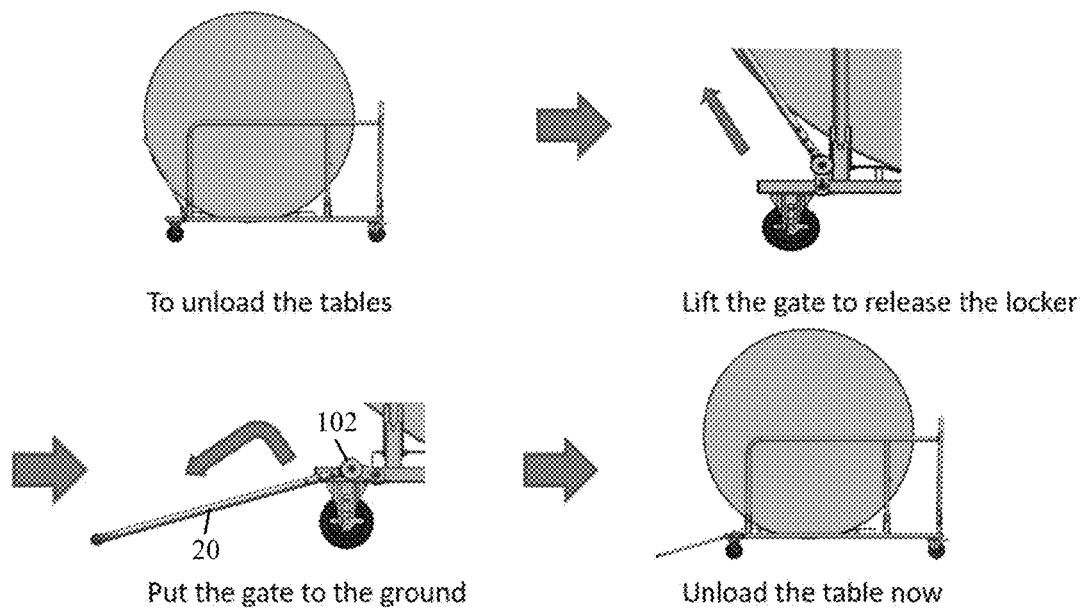
FIG. 28 depicts use of the trolley of FIG. 22

The range of motion of the hinge 102 also enables positioning of the gate 20 to facilitate loading and unloading of the trolley 100. As shown in FIG. 28, the hinge 102 enables the gate 20 to be lowered to the ground, which enables the gate 20 to provide a ramp structure for unloading (and loading) of tables from the trolley 100.

As in the case of the trolley 10, the trolley 100 is advantageously configured to be easily assembled and disassembled, and also easily folded for storage. In addition, the trolley 100 is multifunctional and may be easily adjusted to carry a variety of load sizes, and is configured for use to carry both round and rectangular folding tables of a variety of sizes.

Figure 29:
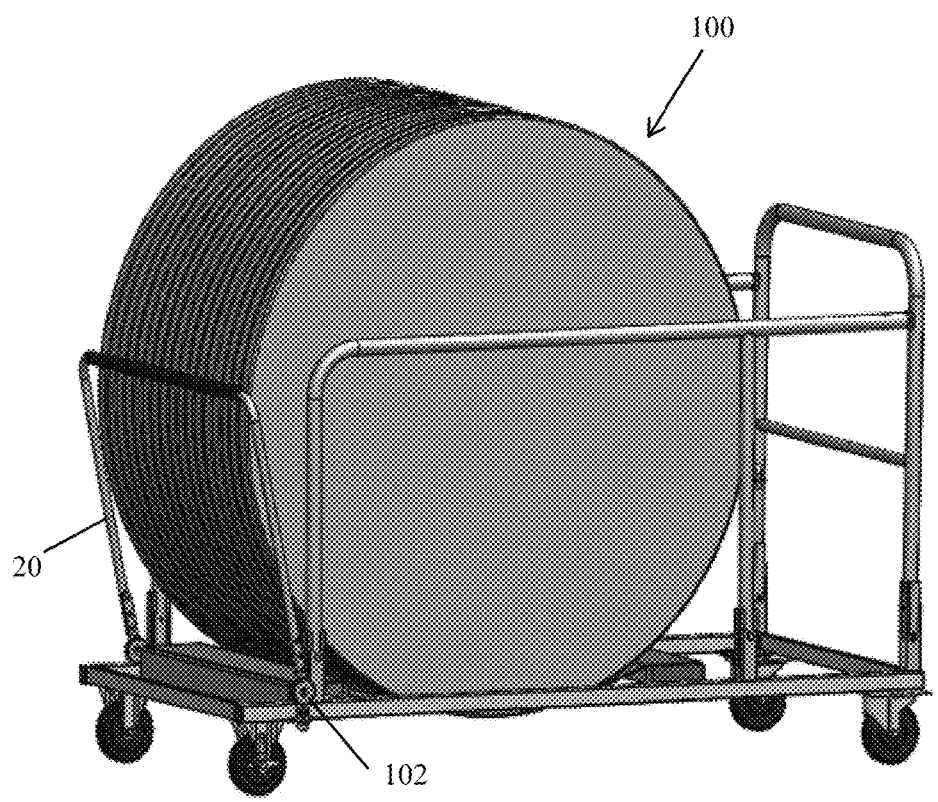
FIG. 29 shows the trolley of FIG. 22 loaded to carry forty-eight inch round folding tables.
Figure 30:
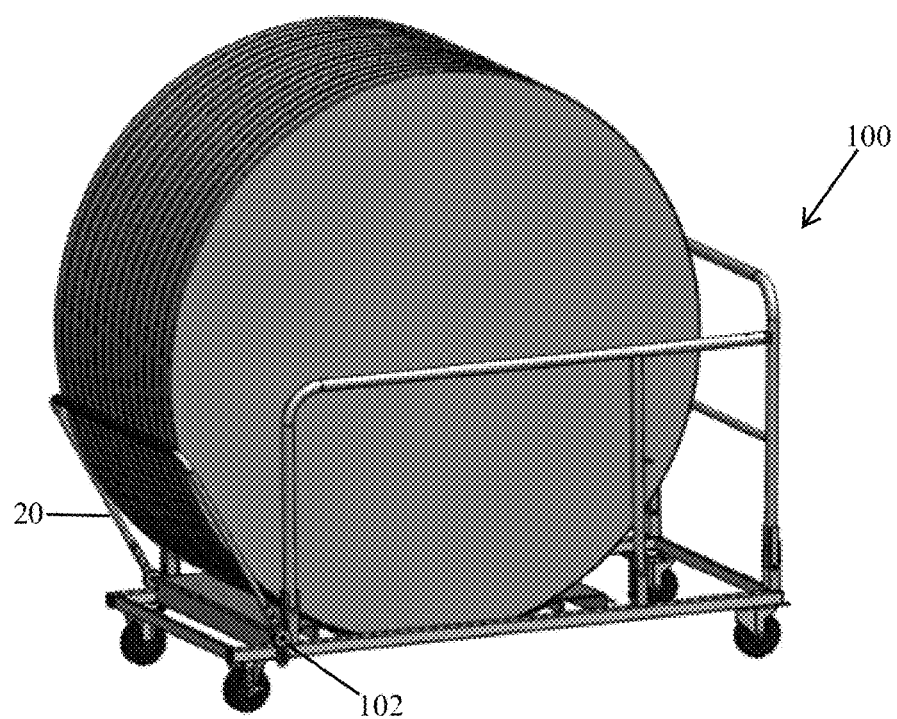
FIG. 30 shows the trolley of FIG. 22 loaded to carry seventy-two inch round folding tables.
Figure 31:
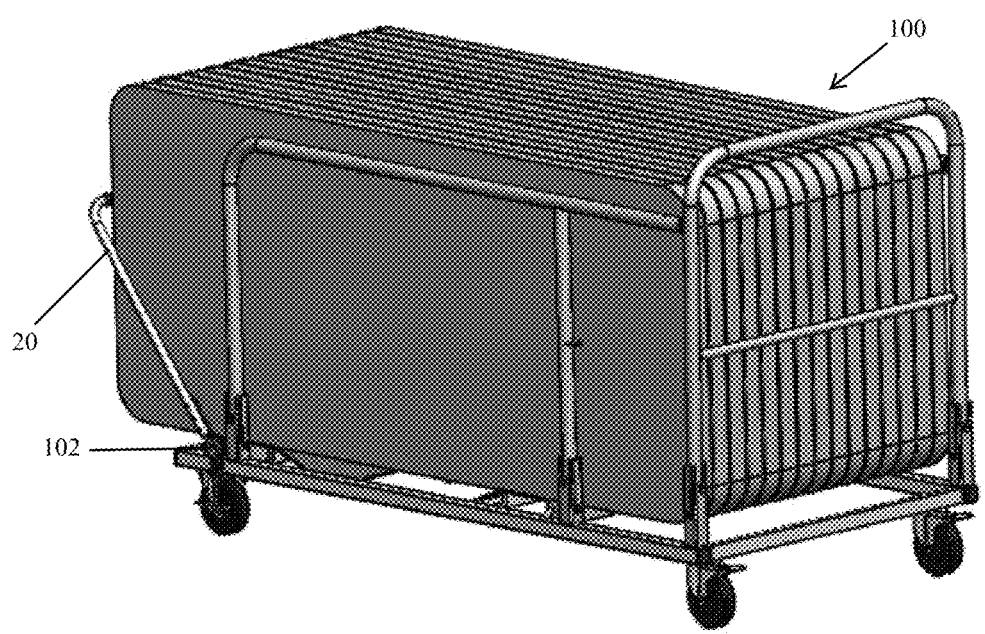
FIG. 31 shows the trolley of FIG. 22 loaded to carry six-foot rectangular folding tables.
Figure 32:
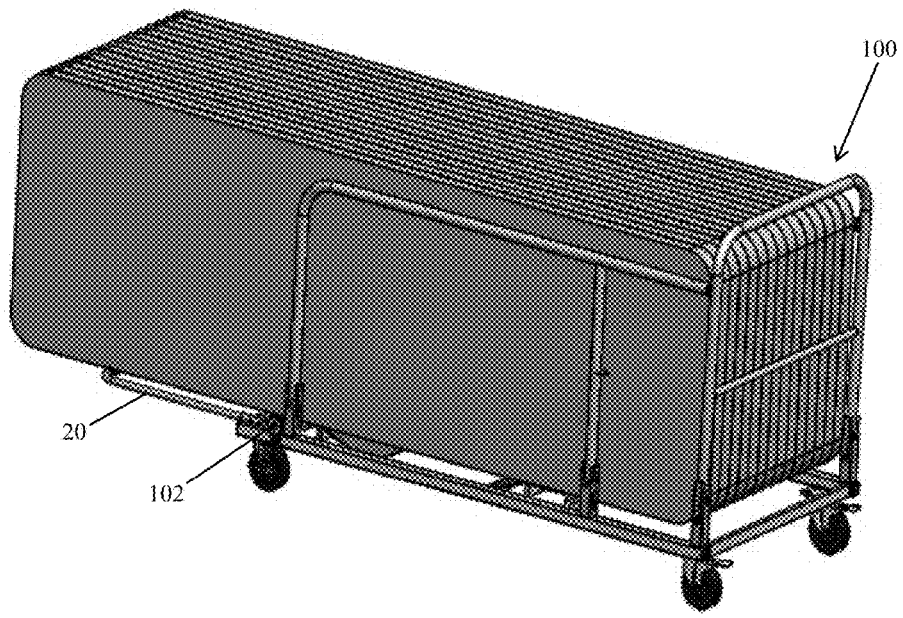
FIG. 32 shows the trolley of FIG. 22 loaded to carry eight-foot rectangular folding tables.

For example, FIG. 29 shows the trolley 100 loaded to carry forty-eight inch round folding tables. FIG. 30 shows the trolley 100 loaded to carry seventy-two inch round folding tables. FIG. 31 shows the trolley 100 loaded to carry six-foot rectangular folding tables. FIG. 32 shows the trolley 100 loaded to carry eight-foot rectangular folding tables.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A trolley configured for use to carry both round and rectangular folding tables of a variety of sizes, the trolley comprising:
   a frame having side edges and a floor located adjacent a loading end of the frame and extending substantially between the side edges of the frame, the floor defined by a planar central portion bounded on each side by angled ramp portions which terminate at elevated flat portions, one of the elevated flat portions being located adjacent the loading end of the frame;

a plurality of receivers located on the frame;

a handle rack locatable at an end of the frame opposite the loading end of the frame, the rack including a pair of rack legs, each rack leg having a handle rack mount located at a lower end of the rack leg and configured to be received by one of the receivers of the frame, wherein the handle rack mounts cooperate with corresponding ones of the receivers of the frame to enable the handle rack to be mounted to the frame and selectively positioned in either an upright position relative to the frame or in a folded orientation wherein the handle rack is folded to a lowered position adjacent the frame; and a pair of side rails locatable adjacent sides of the frame, the side rails including a pair of rail legs, each rail leg having a rail mount located at a lower end of the rail leg and configured to be received by one of the receivers of the frame, wherein the rail mounts cooperate with corresponding ones of the receivers of the frame to enable the side rails to be mounted to the frame and selectively positioned in either an upright position relative to the frame or in a folded orientation wherein the side rails are each folded to a lowered position adjacent the frame.

2. The trolley of claim 1, further comprising a load support removably positionable to span between the side rails.

3. The trolley of claim 1, further comprising a gate pivotally mounted adjacent to the loading end of the trolley.

4. The trolley of claim 3, further comprising a gate adjuster operably associated with the gate and one of the side rails to adjustably position the gate at a desired angle relative to the frame.

5. The trolley of claim 3, further comprising a locking hinge operably associated with the gate to adjustably position the gate at a desired angle relative to the frame.

6. The trolley of claim 1, wherein the frame includes floor supports and the floor comprises two pairs of angled steel plates, each pair having one plate overlying the other, with the overlying plate including a lip that overlies one of the floor supports.

7. A trolley configured for use to carry both round and rectangular folding tables of a variety of sizes, the trolley comprising:

a frame having floor supports and a floor located adjacent a loading end of the frame, the floor comprising two pairs of angled steel plates, each pair of angled plates having one plate overlying the other, with the overlying plate including a lip that overlies one of the floor supports;

a plurality of receivers located on the frame;

a handle rack locatable at an end of the frame opposite the loading end of the frame, the rack including a pair of rack legs, each rack leg having a handle rack mount located at a lower end of the rack leg and configured to be received by one of the receivers of the frame, wherein the handle rack mounts cooperate with corresponding ones of the receivers of the frame to enable the handle rack to be mounted to the frame and selectively positioned in either an upright position relative to the frame or in a folded orientation wherein the handle rack is folded to a lowered position adjacent the frame; and a pair of side rails locatable adjacent sides of the frame, the side rails including a pair of rail legs, each rail leg having a rail mount located at a lower end of the rail leg and configured to be received by one of the receivers of the frame, wherein the rail mounts cooperate with corresponding ones of the receivers of the frame to enable the side rails to be mounted to the frame and selectively positioned in either an upright position relative to the frame or in a folded orientation wherein the side rails are each folded to a lowered position adjacent the frame.

* * * * *